(12) United States Patent
Benbouhout et al.

(10) Patent No.: US 10,270,175 B2
(45) Date of Patent: Apr. 23, 2019

(54) BATTERY PROVIDED WITH THREE ELECTRICAL CONNECTION TONGUES

(71) Applicants: CONTINENTAL AUTOMOTIVE FRANCE, Toulouse (FR); CONTINENTAL AUTOMOTIVE GMBH, Hannover (DE)

(72) Inventors: Rachid Benbouhout, Cugnaux (FR); Sebastien Kessler, Dremil-Lafage (FR); Stephane Billy, Grenade (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 52 days.

(21) Appl. No.: 15/519,884

(22) PCT Filed: Oct. 19, 2015

(86) PCT No.: PCT/EP2015/002067
§ 371 (c)(1),
(2) Date: Apr. 18, 2017

(87) PCT Pub. No.: WO2016/062393
PCT Pub. Date: Apr. 28, 2016

(65) Prior Publication Data
US 2017/0244169 A1    Aug. 24, 2017

(30) Foreign Application Priority Data
Oct. 20, 2014    (FR) ..................... 14 60084

(51) Int. Cl.
*H01Q 7/00*    (2006.01)
*H01Q 9/04*    (2006.01)
(Continued)

(52) U.S. Cl.
CPC ............ *H01Q 9/0421* (2013.01); *H01M 2/00* (2013.01); *H01M 2/26* (2013.01); *H01M 2/30* (2013.01);
(Continued)

(58) Field of Classification Search
CPC ........ H01Q 9/0421; H01Q 1/243; H01Q 1/44; H01M 2/00; H01M 2/26; H01M 2/30
(Continued)

(56) References Cited

U.S. PATENT DOCUMENTS 1,879,595 A    9/1932    Voorhees
3,945,193 A    3/1976    Yasuda et al.
(Continued)

FOREIGN PATENT DOCUMENTS

CN    202996933 U    6/2013
WO    03/009417 A1    1/2003

OTHER PUBLICATIONS

R. Shanta Selva Kurmari et al., "A Modern Approach for Planar Inverted F Antenna Miniaturization", International Journal of Emerging Technology and Advanced Engineering, Mar. 2012, vol. 2, Issue 3.
(Continued)

*Primary Examiner* — Lam T Mai
(74) *Attorney, Agent, or Firm* — Young & Thompson

(57) ABSTRACT

Disclosed is a battery having a positive terminal and a negative terminal and two electrical connection tongues, each tongue secured to one of the terminals thereof. The battery also includes at least one additional connection tongue secured to one of the terminals thereof, forming a radiating element with the electrical connection tongue secured to the same terminal of the battery.

11 Claims, 3 Drawing Sheets

(51) Int. Cl.
*H01M 2/00* (2006.01)
*H01Q 1/24* (2006.01)
*H01Q 1/44* (2006.01)
*H01M 2/26* (2006.01)
*H01M 2/30* (2006.01)

(52) U.S. Cl.
CPC ............... *H01Q 1/243* (2013.01); *H01Q 1/44* (2013.01); *H01Q 7/00* (2013.01); *H01M 2220/30* (2013.01)

(58) Field of Classification Search
USPC .......................................................... 343/720
See application file for complete search history.

(56) References Cited

U.S. PATENT DOCUMENTS

| 5,175,484 | A | * | 12/1992 | Witehira | H02J 1/14 |
| | | | | | 307/10.6 |
| 8,987,935 | B2 | * | 3/2015 | King | B60L 3/0046 |
| | | | | | 307/10.1 |
| 9,746,882 | B2 | * | 8/2017 | Song | G06F 1/1635 |
| 2015/0241935 | A1 | * | 8/2015 | Jang | G06F 1/203 |
| | | | | | 361/679.54 |
| 2016/0260945 | A1 | * | 9/2016 | Rothkopf | H01M 2/0207 |
| 2018/0119290 | A1 | * | 5/2018 | Camp | B60K 37/00 |

OTHER PUBLICATIONS

S. Raghavan et al., "Design of Planar Inverted-F Antenna for Wireless Applications", WSEAS Transactions on Communications, Aug. 2009, vol. 8, Issue 8.

Huynh et al., "Ground plane effects on planar inverted-F antenna (PIFA) performance", IEE Proceedings—Microwaves, Antennas Propagation, Aug. 2003, vol. 150, No. 4.

Tzuenn-Yih Wu et al., "On the Impedance Bandwidth of a Planar Inverted-F Antenna for Mobile Handsets", Microwave and Optical Technology Letters, Feb. 20, 2002, vol. 32, No. 4.

International Search Report, dated Jan. 12, 2016, from corresponding PCT application.

* cited by examiner

BATTERY PROVIDED WITH THREE ELECTRICAL CONNECTION TONGUES

BACKGROUND OF THE INVENTION

Field of the Invention

The present invention relates to a battery used as an antenna for a mobile electronic device capable of transmitting and/or receiving radiofrequency signals. More specifically, the battery according to the invention is intended to be borne by devices for monitoring the pressure of the tires of and/or by devices for accessing (starting) an automotive vehicle, or by mobile devices used to transmit wireless signals.

It is already known practice in the automotive field to fit vehicles with devices for monitoring the pressure of the tires. Such devices are usually composed of:
 a wheel module, mounted on each wheel of the vehicle and designed to measure the pressure exerted on the inside of the tire (along with other parameters such as the temperature, the acceleration, etc.) and;
 an electronic unit (computer) mounted on the chassis of the vehicle.

The parameters measured by the wheel module are regularly transmitted (by wireless link) to the electronic unit located on the chassis. This transmission is achieved by means of LF (low-frequency), RF (radiofrequency) or UWB (ultra wideband) signals. The sent and received signals may employ frequencies of the order of a few kHz (for example 125 kHz) up to those of the order of a few MHz (for example 315 MHz, 433 MHz) or many GHz (for example 2.4 GHz).

The transmission of the measured parameters requires, on each wheel of the vehicle, the wheel module to have an autonomous electrical power supply and a transmission antenna (potentially also a reception antenna). Of course, this wheel module must be as small and as light as possible while consuming as little energy as possible. However, these wheel modules currently comprise batteries of button cell type, electronic components arranged on an electronic circuit board and an antenna. This antenna often takes the form of a loop antenna and is relatively bulky.

In order to decrease the bulk and manufacturing cost of wheel modules, it is known practice to replace the antenna present in the wheel modules by using the connection tabs of the battery as an antenna. Thus, the battery plays a dual role as both an antenna and an electrical power supply source, thereby making it possible to omit the use of a dedicated antenna and hence to reduce the weight, facilitate the manufacturing process, decrease the dimensions and, as a result, the cost of the wheel module.

Other devices exist which are installed in the vehicle or carried by the driver, such as for example access and starting devices (key fobs, etc.) or smartphones, in which the use of a battery as an antenna also makes it possible to decrease manufacturing costs and dimensions.

However, using the connection tabs of a battery as an antenna has a drawback. Specifically, these connection tabs (two in number—one connection to the positive terminal of the battery and one connection to the negative terminal of the battery) are each secured to one face of the battery or to two elements placed on either side of the battery. As such, since they are positioned on either side of the battery, when they are used as antennas, the signals received by this antenna pass through the battery. This may alter the characteristics of the antenna over time and negatively affect the radiofrequency performance of the product.

BRIEF SUMMARY OF THE INVENTION

Specifically, the chemical composition of the battery, its dimensions and the materials used form an internal parasitic inductance/resistance/capacitance (i.e. a parasitic impedance) which varies over time due to the aging of the materials forming the battery. It is therefore very difficult to model these variations and to counter them by introducing correction values. Additionally, it has proven to be difficult to manufacture batteries that would have a determined parasitic impedance. Battery manufacturers are not capable of measuring and monitoring this parasitic impedance.

This difficult-to-model parasitic impedance is also linked to the manufacturing process of the battery, resulting in it differing for different manufacturers even though the power and the dimensions of the battery are otherwise identical.

One aim of the present invention is therefore to remove the dependence of the antenna-forming battery on the physical aging parameters of this battery.

To this end, the present invention relates to a battery equipped with a positive terminal and a negative terminal and two electrical connection tabs, each secured to one of its terminals.

According to the invention, the battery additionally comprises at least one additional connection tab secured to one of its terminals, forming a radiating element with the electrical connection tab that is secured to the same terminal of the battery.

Thus, in a known manner, the battery is capable of supplying any device with electrical power via the two electrical connection tabs that are each secured to one terminal of the battery, but additionally, according to the invention, at least one third tab is fixed to one of the terminals of the battery in order to transmit or receive radiofrequency signals in combination with the electrical connection tab that is secured to the same terminal of the battery. Consequently, the signals transmitted or received by the antenna-forming tabs no longer pass through the battery. The two tabs forming the antenna are effectively secured to one and the same terminal of the battery and therefore to one and the same face of the battery. Consequently, the transmitted/received signal passes from one tab to the other without passing through the battery.

This makes it possible to remove all dependence on the physical aging parameters of the battery linked to the passage of a signal through the interior of a battery and to be unaffected by any parasitic impedance of the battery.

Thus, the invention consists of preventing the signals received/transmitted by the antenna-forming elements from passing through the battery. To this end, the signals received/transmitted by the battery are guided around the battery.

The invention makes it possible in particular to be independent of the intrinsic (mainly chemical) characteristics of the battery.

Advantageously, the additional connection tab is connected to an electronic circuit.

Again advantageously, the additional connection tab forms a loop antenna with the tab associated with the same terminal of the battery. As a variant, this additional connection tab forms a monopole antenna.

According to one embodiment of the invention, the additional connection tab forms, with one of the electrical connection tabs, a planar inverted-F antenna (PIFA), a first connection tab is connected, on the one hand, to one of the terminals of the battery and, on the other hand, to ground, a second connection tab is connected, on the one hand, to the other terminal and, on the other hand, receives an excitation signal. The additional connection tab forming a radiating track (i.e. an antenna).

Advantageously, the resonant frequency of the PIFA is set by the positioning and/or the dimensions of the additional connection tab.

BRIEF DESCRIPTION OF THE DRAWINGS

Other objects, features and advantages of the present invention will become apparent from the following description, provided by way of non-limiting example and with reference to the appended drawings, in which:

FIG. 5b is a schematic view illustrating an equivalent circuit diagram of the assembly illustrated in FIG. 5a;

FIG. 6b is a schematic view illustrating a circuit diagram corresponding to the antenna shown in FIG. 6a.

DETAILED DESCRIPTION OF THE PREFERRED EMBODIMENTS

Figure 1:
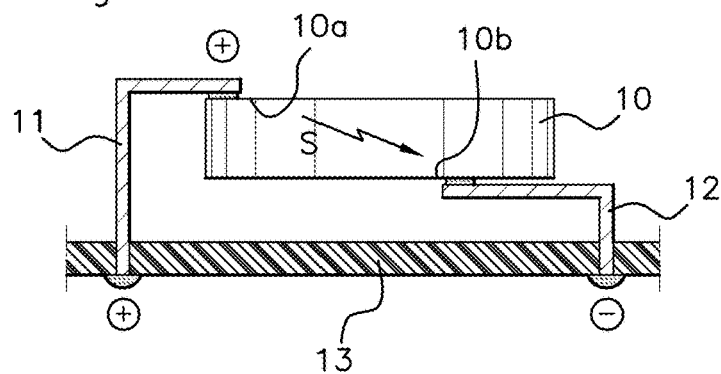
FIG. 1 is a schematic view in cross section illustrating a battery according to the prior art placed on an electronic circuit board.

As illustrated in FIG. 1, the batteries 10 of known type are for example composed of a button cell, each of the faces 10a and 10b of which forms one of the terminals of the battery. In the example shown, the face 10a is a positive terminal and the face 10b is a negative terminal.

This battery is equipped, in a manner known per se, with two electrical connection tabs 11 and 12. Each of these tabs is secured, in a manner known per se (most commonly by means of welding, but also by means of clamping, etc.), to one of the terminals of the battery.

Such a battery is placed on an electronic circuit board (PCB) 13 so as to supply this electronic circuit board with electrical power and to receive or transmit signals S from/to a remote electronic device (not shown).

When the connection tabs of the battery are used as an antenna, the received/transmitted signal S passes through the interior of the battery in order to pass from one tab to the other. As mentioned above, this passage through the interior of the battery induces variations in parasitic impedance, which are difficult to measure and to model. Additionally, these variations are not stable over time and vary depending on the chemical compounds used in the battery, on the wear of the battery, on its method of manufacture, on the battery manufacturer, etc.

The aim of the present invention is therefore to be unaffected by parasitic variations produced in batteries used as antennas.

To this end, according to the invention (FIG. 2), at least one additional connection tab 14 is secured to one of the terminals of the battery. In the example shown in FIG. 2, this additional tab is secured to the positive pole of the battery 10 just like the connection tab 11.

As a variant, as will be seen below, the connection tab 14 could equally be secured to the negative terminal of the battery, without affecting the scope of the invention.

Figure 2:
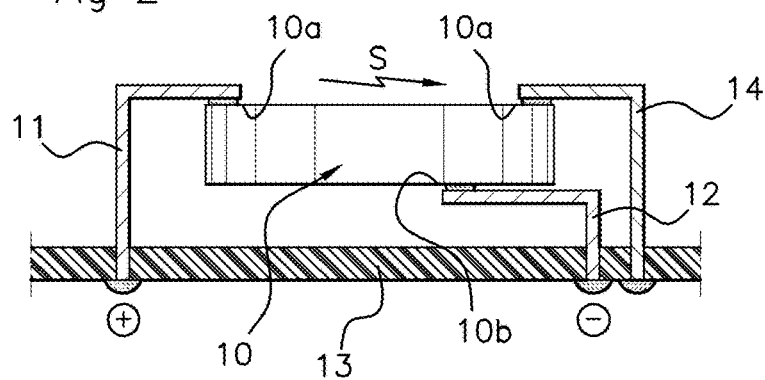
FIG. 2 is a schematic view, akin to that of FIG. 1, of a battery according to the present invention.

As shown in FIG. 2, the battery 10 is capable of supplying an electronic circuit 13 with power via a connection tab 11 connecting to a positive terminal and via a connection tab 12 connecting to a negative terminal. The battery 10 is also capable of receiving any radiofrequency signal S via the additional connection tab 14 coupled to the connection tab 11. As such, the assembly of the connection tabs 14 and 11 forms a loop antenna.

By adding the additional connection tab 14, the radiofrequency currents received or transmitted by the loop antenna 11, 14 are forced to pass around the periphery of the battery without ever penetrating the interior. Consequently, by channeling these radiofrequency currents outside the battery, the received/transmitted signal S is no longer subject to the variations in impedance linked to the internal parameters of the battery.

The addition of the additional tab 14 is inexpensive, since it is just a simple conductive metal tab. This tab is also not difficult to put in place, since it is fixed to the battery in the same way as the connection tabs 11 and 12 that are already present. However, it makes it possible to channel (guide) the received/transmitted signal S outside the battery and to keep it out of the variation-causing areas located inside the battery.

The invention thus makes it possible, in an inexpensive manner, to avoid determining and modeling the variations in impedance taking place inside of the battery, these phenomena being unstable and still little understood.

Figure 3A:
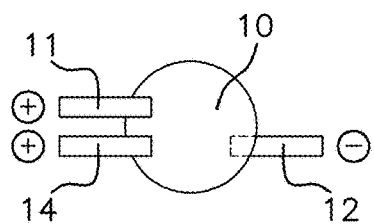
FIGS. 3a to 3c are schematic views from above of various variant positions of the additional tab when it is secured to a positive terminal of the battery.
Figure 3B:
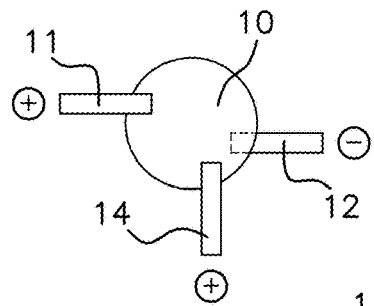
Figure 3C:
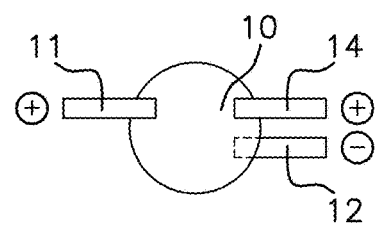
Figure 4A:
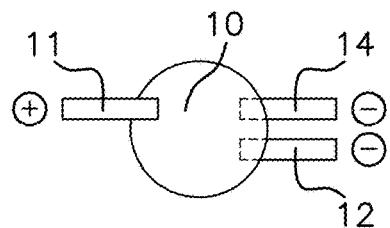
FIGS. 4a to 4c are schematic views from above of various variant positions of the additional tab when it is secured to a negative terminal of the battery.
Figure 4B:
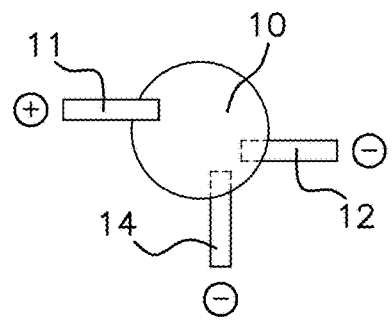
Figure 4C:
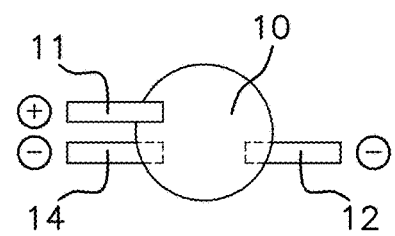

As shown in FIGS. 3a to 3c, the positioning of the additional tab 14 on the periphery of the battery 10 may be parallel to that of the connection tab 11 (FIG. 3a), perpendicular to the connection tab 11 (FIG. 3b) or substantially aligned with and opposite the connection tab 11 (FIG. 3c). This positioning allows the free radiating volume around the antenna produced by the connection tabs 11 and 14 to be increased at leisure. This allows the gain of the antenna produced by the tabs 11 and 14 to be optimized. Depending on the desired gain for the antenna-forming tabs 11 and 14, those skilled in the art will choose the most suitable positioning, without being limited to those shown in FIGS. 3a to 3c. As a variant, as shown in FIGS. 4a to 4c, the additional connection tab 14 may be connected to the negative terminal of the battery instead of to the positive terminal. In this case, the antenna for receiving/transmitting the signal S is formed by the assembly of the tabs 12 and 14. As in the case shown in FIGS. 3a to 3c, the signals S transmitted/received by this antenna are channeled (guided) around the periphery of the battery 10 and do not pass through the interior of the battery.

Again, the positioning of the additional connection tab 14 on the periphery of the battery may take any value. For example, the tab 14 may be positioned substantially in parallel to the tab 12 (FIG. 4a), perpendicularly to the tab 12 (FIG. 4b) or in the extension of and opposite the tab 12 (FIG. 4c).

Of course, the additional connection tab 14 may also assume any intermediate positions between those shown in FIGS. 3a to 3c and 4a to 4c. The positioning of this additional connection tab 14 is determined according to the desired gain for the antenna formed by the tabs 12 and 14, or 11 and 14.

Figure 5A:
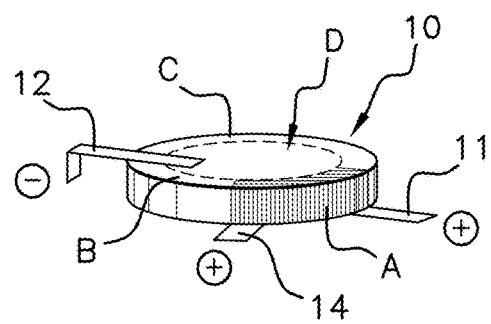
FIG. 5a is a schematic view in perspective illustrating a variant of the antenna according to the invention in the form of an inverted F (PIFA), with the additional tab being connected to the positive terminal.
Figure 5B:
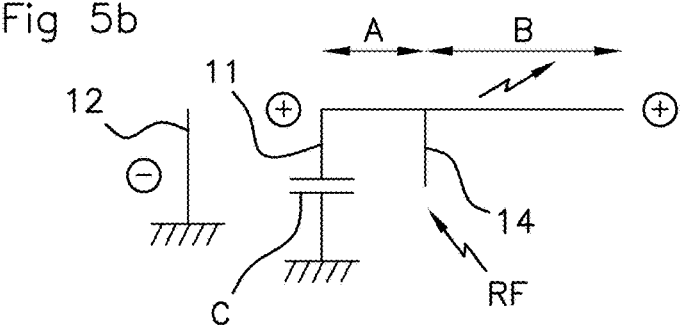

FIG. 5a illustrates a battery 10 used as an antenna, and the equivalent circuit diagram of which is shown in FIG. 5b.

The battery 10 is a button cell having (in a manner known per se) an annular crown C forming the positive terminal of the battery and a cylindrical central portion D forming the negative terminal of the battery. Of course, this is only one exemplary embodiment, the positive and negative terminals of the battery could equally be inverted and/or take different forms from those shown.

In this exemplary embodiment, an electrical connection tab 11 is connected to the positive terminal of the battery (i.e. to the crown-shaped portion C) and an electrical connection tab 12 is connected to the negative terminal of the battery (i.e. to the cylindrical central portion D). According to the invention, the additional connection tab 14 itself is connected to the positive terminal of the battery (crown C) and forms, with the tab 11, an antenna.

As may be seen more clearly in FIG. 5b, the equivalent circuit diagram of the antenna thus formed takes the form of an inverted F. In this diagram, the tabs 11 and 14 are connected via a portion A of the annular crown C. One role of this portion A of the annular crown C is to match the length of the antenna to the desired resonant frequency.

The portion B of the annular crown C serves as a radiating element with the connection tab 11 and the additional tab 14. It is actually this portion that transmits and receives the radiofrequency signals. The portions A and B of the annular crown C and the electrical 11 and additional 14 connection tabs together form an inverted F (see in particular FIG. 5b). Such an antenna is referred to as a PIFA (planar inverted-F antenna), since it takes the form of an inverted F and its radiating portion forms a plane (here the portion B of the crown C).

It should be noted that in the exemplary embodiment illustrated in FIGS. 5a and 5b, a first connection tab (for example the tab 12) is connected, on the one hand, to one of the terminals (the negative terminal) of the battery and, on the other hand, to ground (FIG. 5b), a second connection tab (for example the connection tab 11) is connected, on the one hand, to the other terminal (the positive terminal) and, on the other hand, receives an excitation signal, and the additional connection tab 14 forms, with the portion B of the crown C, a radiating track of the antenna (see in particular FIG. 5b in which an equivalent circuit diagram of the assembly illustrated in FIG. 5a is provided).

Figure 6A:
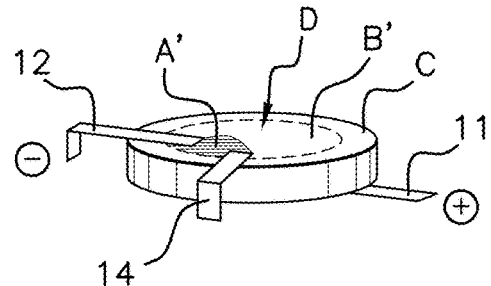
FIG. 6a is a schematic view illustrating a variant of the antenna according to the invention in the form of an inverted F (PIFA), with the additional antenna being connected to the negative terminal.
Figure 6B:
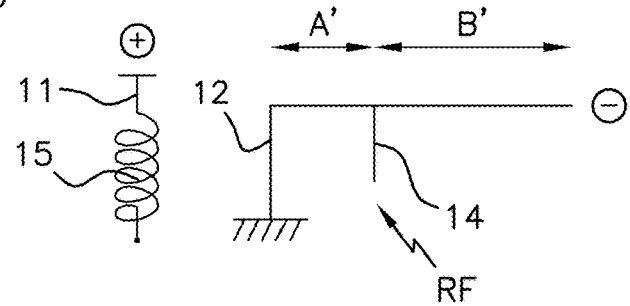

Of course, the additional connection tab 14 may be connected to the negative terminal of the battery (FIGS. 6a and 6b). In this case, the electrical connection tab 12, the additional tab 14 and the plane B' (which belongs to the central portion D) form the radiating element of the antenna-battery. This is also a PIFA-type antenna. One role of the portion A of the central portion D is to match the length of the antenna to the desired resonant frequency.

In the context of this embodiment, the connection tab 11 that is connected to the positive terminal of the battery is additionally associated with an inductor 15, the role of which is to prevent the radiofrequency signal from traveling back toward a microprocessor or any other component of the electronic circuit.

It should be noted that in the exemplary embodiment illustrated in FIGS. 6a and 6b, a first connection tab (the connection tab 12) is connected, on the one hand, to one of the terminals (the negative terminal) of the battery and, on the other hand, to ground, a second connection tab (the connection tab 11) is connected to the other terminal (the positive terminal) and the additional connection tab 14 receives an excitation signal and forms, with the portion B' of the central portion D, a radiating plane (see in particular FIG. 6b in which an equivalent circuit diagram of the assembly illustrated in FIG. 6a is provided).

These antennas of PIFA-type have the advantage of being easy to adjust (to optimize) without excessive losses in terms of signal level (in dB) so as to obtain the desired resonant frequency for the antenna thus formed.

It should be noted that for all of the embodiments described above, the resonant frequency of the antenna is set by the length and/or the width and/or the positioning and/or the thickness of the additional connection tab 14.

It should be noted that the number of additional tabs may be greater than one. Likewise, the dimensions (length, width, thickness) of the electrical connection tabs and of the one or more additional tabs may be modified in order to facilitate the adjustment of the resonant frequency of the antenna.

The invention claimed is:

1. A battery equipped with a positive terminal and a negative terminal and two electrical connection tabs (11, 12), each secured to one of its terminals, said battery further comprising at least one additional connection tab (14) secured to one of its terminals, forming a radiating element with the electrical connection tab that is secured to the same terminal of the battery, wherein the additional connection tab (14) forms, with one of the electrical connection tabs (11, 12), a planar inverted-F antenna (PIFA), and wherein a first connection tab is connected to one of the terminals of the battery and to ground, a second connection tab is connected to the other terminal and receives an excitation signal, and wherein the additional connection tab is left free and forms a monopole.

2. The battery as claimed in claim 1, wherein the additional connection tab (14) is connected to an electronic circuit (13).

3. The battery as claimed in claim 1, wherein the resonant frequency of the antenna is set by the length and/or the width and/or the thickness and/or the positioning of the additional connection tab.

4. The battery as claimed in claim 2, wherein the positioning of the additional connection tab (14) on the periphery of the battery allows the gain of the antenna to be adjusted by varying the free radiating volume of the antenna.

5. The battery as claimed in claim 1, wherein the positioning of the additional connection tab (14) on the periphery of the battery allows the gain of the antenna to be adjusted by varying the free radiating volume of the antenna.

6. The battery as claimed in claim 3, wherein the positioning of the additional connection tab (14) on the periphery of the battery allows the gain of the antenna to be adjusted by varying the free radiating volume of the antenna.

7. A battery equipped with a positive terminal and a negative terminal and two electrical connection tabs (11, 12), each secured to one of its terminals, said battery further comprising at least one additional connection tab (14) secured to one of its terminals, forming a radiating element with the electrical connection tab that is secured to the same terminal of the battery, wherein the positioning of the additional connection tab (14) on the periphery of the battery allows the gain of the antenna to be adjusted by varying the free radiating volume of the antenna.

8. The battery as claimed in claim 7, wherein the additional connection tab (14) forms a loop antenna with the tab associated with the same terminal of the battery.

9. The battery as claimed in claim 7, wherein the additional connection tab (14) forms a monopole antenna.

10. The battery as claimed in claim 7, wherein the additional connection tab (14) forms, with one of the electrical connection tabs (11, 12), a planar inverted-F antenna (PIFA).

11. The battery as claimed in claim 7, wherein the additional connection tab (14) is connected to an electronic circuit (13).

\* \* \* \* \*